(12) United States Patent
Van Tassel (10) Patent No.: US 8,375,876 B2
(45) Date of Patent: Feb. 19, 2013

(54) SYSTEM AND METHOD FOR CONTAINERIZED TRANSPORT OF LIQUIDS BY MARINE VESSEL

(75) Inventor: Gary W. Van Tassel, Seaford, VA (US)

(73) Assignee: Argent Marine Management, Inc., Incline Village, NV (US)

( * ) Notice: Subject to any disclaimer, the term of this patent is extended or adjusted under 35 U.S.C. 154(b) by 186 days.

(21) Appl. No.: 12/960,490

(22) Filed: Dec. 4, 2010

(65) Prior Publication Data

US 2012/0137955 A1    Jun. 7, 2012

(51) Int. Cl.
*B63B 25/08* (2006.01)
(52) U.S. Cl. ....................................... 114/74 R
(58) Field of Classification Search ........... 114/65 R, 114/72, 73, 74 R, 74 T, 74 A, 78, 232, 233, 114/256, 121, 124, 125; 62/45.1, 48.1, 50.2, 62/50.7; 123/1 A; 220/1.5
See application file for complete search history.

(56) References Cited

U.S. PATENT DOCUMENTS

| | | | |
|---|---|---|---|
| 3,823,681 A | | 7/1974 | Cushing et al. |
| 4,066,184 A | * | 1/1978 | Cuthbert et al. ......... 220/560.11 |
| 4,182,254 A | | 1/1980 | Secord |
| 4,552,082 A | * | 11/1985 | Grey ............................. 588/321 |
| 5,803,005 A | | 9/1998 | Stenning et al. |
| 5,839,383 A | | 11/1998 | Stenning et al. |
| 6,044,647 A | * | 4/2000 | Drube et al. .................... 62/50.1 |
| 6,234,714 B1 | | 5/2001 | Chattey |

(Continued)

FOREIGN PATENT DOCUMENTS

| | | |
|---|---|---|
| EP | 2228294 | 9/2010 |
| JP | 62274199 | 11/1987 |

(Continued)

OTHER PUBLICATIONS

G. W. Van Tassel, "LNG as a Vessel and General Transportation Fuel Developing the Required Supply Infrastructure," presented on Nov. 5, 2010 at the Annual Meeting of the Society of Naval Architects and Marine Engineers in Seattle, WA, USA.

(Continued)

*Primary Examiner* — Daniel Venne
(74) *Attorney, Agent, or Firm* — Amster, Rothstein & Ebenstein LLP (57) ABSTRACT

A marine vessel, and a system and method of using the marine vessel, to facilitate the introduction of bulk liquid commodities, such as LNG, into the established and extensive worldwide intermodal transportation system, which is based on containerized shipments. The marine vessel is a specialized vessel, of either ship or barge form, that is capable of holding a large number of ISO-sized intermodal LNG tanks and is configured so as to have at one and the same time characteristics of both a tanker vessel (e.g., a gas carrier) and a container vessel. The intermodal LNG tanks connect to a piping system of the marine vessel and are thereby interconnected in such a manner that allows the interconnected intermodal LNG tanks to behave as if they constitute a typical LNG vessel bulk liquid tank to facilitate efficient loading at a typical marine LNG terminal. The containerized intermodal LNG tanks are capable of discharging liquids to a marine terminal as if in a bulk mode, or of being disconnected from the common interconnection system to allow lift-off discharge of the intermodal LNG tanks at a typical cargo container port so that the intermodal LNG tanks can enter the existing intermodal transportation system for further distribution to the end user by other marine vessels, over-the-road truck, or by rail.

55 Claims, 6 Drawing Sheets

U.S. PATENT DOCUMENTS

| | | |
|---|---|---|
| 6,339,996 B1 | 1/2002 | Campbell |
| 6,460,721 B2 | 10/2002 | Bowen et al. |
| 6,640,554 B2 | 11/2003 | Emmer et al. |
| 6,655,155 B2 | 12/2003 | Bishop |
| 6,877,454 B2 | 4/2005 | Bowen et al. |
| 7,069,730 B2 | 7/2006 | Emmer et al. |
| 2003/0178093 A1 | 9/2003 | Gershtein et al. |
| 2006/0053806 A1 | 3/2006 | Van Tassel |
| 2006/0068993 A1 | 3/2006 | Egan |
| 2006/0213222 A1 | 9/2006 | Whitesell |
| 2007/0100178 A1 | 5/2007 | Carstens et al. |
| 2008/0127673 A1 | 6/2008 | Bowen et al. |
| 2008/0164251 A1* | 7/2008 | Fawley .................. 220/1.5 |
| 2009/0282839 A1 | 11/2009 | Sigal |
| 2010/0000252 A1 | 1/2010 | Morris et al. |
| 2010/0050925 A1 | 3/2010 | Donnelly et al. |
| 2010/0186426 A1* | 7/2010 | Campbell .................. 62/50.2 |
| 2010/0205979 A1 | 8/2010 | Gentry et al. |
| 2010/0263389 A1 | 10/2010 | Bryngelson et al. |

FOREIGN PATENT DOCUMENTS

| | | |
|---|---|---|
| WO | WO2006025841 | 3/2006 |
| WO | WO2008109006 | 9/2008 |

OTHER PUBLICATIONS

"LNG ISO Intermodal Containers," available from Chart Inc.
http://www.transoceangas.com/, website for Trans Ocean Gas, p. 1, paragraphs 1-4.
http://www.japex.co.jp/english/business/japan/lng.html, website for JAPEX Japan Petroleum Exploration Co., Ltd.
http://www.trimarinercorporation.com/index.html, website for Trimariner Corporation, LLC.

\* cited by examiner

SYSTEM AND METHOD FOR CONTAINERIZED TRANSPORT OF LIQUIDS BY MARINE VESSEL

FIELD OF THE INVENTION

The present invention generally relates to the transportation and distribution of bulk liquid commodities. More particularly, the present invention relates to a marine vessel and a system and method for introducing bulk liquid commodities, such as liquefied natural gas (LNG), into the established and extensive intermodal transportation system.

BACKGROUND OF THE INVENTION

LNG holds great promise as a transportation fuel for two principal reasons. First, its use results in significant reductions in SOx, NOx, $CO_2$ and particulate emissions. Second, increased use of LNG, more specifically natural gas, as a transportation fuel, replacing traditional distillates such as gasoline and diesel fuel, has the added, but no less important, benefit of reducing dependency on crude oil, most importantly imported crude oil, and easing the burden on refining capacity.

The emission reductions exceed even the most far-reaching emissions regulations, without the need for post combustion exhaust gas treatment methodologies or other emissions systems that degrade engine efficiency. The use of LNG as a transportation fuel for city fleet vehicles, dedicated trucking routes, and even rail locomotives has been demonstrated with a high degree of success, but with limited implementation. The success of LNG as a liquid fuel also applies to vessels—including harbor tugs, ferries, supply vessels, short-sea shipping "roll-on/roll-off" and container vessels, and deep-sea vessels—for in-port and coastal power requirements. The technology is well established, with a number of noteworthy vessels in service and under construction that utilize LNG as propulsion fuel. Based on these early successes, the marine industry is evaluating wider application of LNG as an environmentally friendly marine fuel, replacing heavy fuel oils and light distillate fuels for ocean, coastal, and harbor service.

What is needed to increase the use of LNG as a transportation fuel in the U.S. and elsewhere is the development of a coherent LNG distribution infrastructure. Without such an infrastructure, the use of LNG as a fuel will be confined to local niche markets only, and thus it will never realize its true potential. Today, LNG, as a transportation fuel, is generally produced in limited quantities in the U.S. by liquefying pipeline gas, in small-scale liquefaction plants, in highly localized areas. This is not an efficient approach, and it will not allow LNG to reach its full potential as a highly desirable, energy dense, liquid fuel for both transportation and non-transportation uses.

A traditional role for LNG is the transportation of large volumes of natural gas over long distance ocean routes. The natural gas is liquefied to a cryogenic liquid at a location near the gas source, often in remote areas. The LNG is then loaded in large, specialized tankers for the ocean transit to the destination or re-gasification facility. At the destination facility, the LNG is unloaded from the tanker to tanks on shore. From the shore based tank storage, the LNG is then increased in pressure to the required downstream pressure and re-gasified and consumed at or near the destination facility or distributed to the end user by conventional pipeline. Although an efficient transportation system and method to deliver natural gas from remote sources of supply, this system does not provide for the efficient distribution of LNG as an energy dense liquid fuel to the transportation and power generation industries.

In view of the foregoing background, it is an object of the present invention to provide a critical missing link. That link will enable existing LNG terminals—liquefaction, regasification or other—in various locations throughout the world, to connect commercially to the extensive intermodal transportation systems throughout the world to implement safe and reliable LNG fuel supply distribution networks. This will support and hasten the use of LNG as an alternative fuel to power transportation assets, electric generating facilities, and other facilities that are capable of using natural gas as a fuel or feedstock. The anticipated results of making LNG more widely available will be the conversion from heavy and light distillate fuel oils to natural gas providing significant, near-term, emissions reductions; reduced dependency on crude oil; and reduced demand for crude oil refining capacity.

SUMMARY OF THE INVENTION

It has now been found that the above-mentioned and related objects of the present invention are obtained in the form of several separate, but related, aspects, including a specialized marine vessel and a system and method for using the same.

In accordance with the preferred embodiments of the invention described below, LNG that is available at marine LNG terminals, while still in its liquid state, is efficiently loaded into intermodal LNG tanks, which are secured aboard a specialized marine vessel that is configured to have at one and the same time characteristics of both a tanker vessel and a container vessel, and is capable of loading and unloading bulk liquids at a marine terminal and at a container port, for distribution via maritime routes to various ports where the intermodal LNG tanks can be individually lifted from the intermodal LNG vessel and further distributed to end users via the established intermodal transportation system. The LNG can be loaded into the intermodal LNG tanks while they are secured aboard the intermodal LNG vessel at any marine LNG terminal, including, liquefaction, re-gasification ("re-gas"), peak shaving, satellite, distribution, or other terminal configurations, provided that the marine loading or unloading facility is capable of safely berthing the intermodal LNG vessel.

Although the presently preferred embodiments of the present invention described below are directed to the transportation and distribution of LNG, the present invention is not to be understood as being limited to LNG. Any bulk liquid commodity can be transported and distributed using the marine vessel and the system and method disclosed herein. Exemplary bulk liquid commodities that fall within the scope of the present invention include, but are not limited to, light distillate fuels, gasoline, ethanol, etc., as well as other non-fuel bulk liquids.

More particularly, a specialized marine vessel in accordance with an exemplary embodiment of the invention is capable of loading and unloading LNG at an LNG marine terminal and at a container port or similar marine facility with a suitable loading/unloading infrastructure.

A marine vessel in accordance with another exemplary embodiment of the invention comprises a piping system and intermodal LNG tanks that are individually and detachably connected to the piping system. The intermodal LNG tanks can be simultaneously filled with LNG to a greater or lesser extent at a marine LNG facility, and can be lifted off the marine vessel individually at a container facility or other suitable marine facility.

In an exemplary embodiment, intermodal LNG tanks can be discharged to an LNG facility as if in a bulk mode.

In an exemplary embodiment, a vent system is incorporated in the piping system, and LNG vapor is vented from the intermodal LNG tanks to the vent system.

In an exemplary embodiment, a vapor system is incorporated in the piping system, and boil-off gas from the intermodal LNG tanks is provided to the vapor system.

In exemplary embodiments, the boil-off gas can be re-liquefied (in whole or in part) and returned to the intermodal LNG tanks by the piping system, consumed by the vessel (e.g., in the propulsion engines of the vessel), disposed of in a gas combustor unit, or vented to the atmosphere.

In an exemplary embodiment, a liquid transfer system is incorporated in the piping system, and LNG is transferred from the intermodal LNG tanks to the transfer system.

In an exemplary embodiment, a manifold is coupled to the liquid transfer system for loading LNG onto, or unloading LNG from, the marine vessel.

In an exemplary embodiment, the marine vessel includes at least one tank for bulk storage of LNG.

In exemplary embodiments, the at least one bulk storage tank can be connected to the intermodal LNG tanks, and LNG can be transferred from the at least one bulk storage tank to at least one of the intermodal LNG tanks or vice versa. The at least one bulk storage tank can be fitted within the marine vessel either above or below the main deck.

A method for transporting LNG intermodally in accordance with another exemplary embodiment of the invention comprises the steps of providing a marine vessel with a piping system, interconnecting intermodal LNG tanks to the piping system, and filling the intermodal LNG tanks with LNG at an LNG marine terminal as if in a bulk mode.

In an exemplary embodiment, the intermodal LNG tanks are detachably secured to the piping system.

In an exemplary embodiment, the intermodal LNG tanks are interconnected so as to allow their rapid connection and disconnection without the use of tools.

In an exemplary embodiment, at least one of the intermodal LNG tanks is detached from the piping system, is lifted from the marine vessel, and is transferred to an intermodal form of transportation.

In an exemplary embodiment, at least one empty intermodal LNG tank is loaded onto the marine vessel and are detachably connected to the piping system.

In an exemplary embodiment, LNG is discharged from the intermodal LNG tanks to an LNG marine terminal as if in a bulk mode.

A marine vessel in accordance with another exemplary embodiment of the present invention is capable of loading and unloading bulk liquids at a marine terminal and at a container port or similar facility with a suitable loading/unloading infrastructure.

A marine vessel in accordance with another exemplary embodiment of the present invention comprises a piping system and intermodal tanks that are individually and detachably connected to said piping system. The intermodal tanks can be simultaneously filled to a greater or lesser extent with a bulk liquid at a loading facility, and can be lifted off the marine vessel individually at a container facility or other suitable marine facility.

In an exemplary embodiment, the intermodal tanks can be discharged to a marine terminal as if in a bulk mode.

In an exemplary embodiment, the marine vessel includes at least one tank for bulk storage of the bulk liquid.

In an exemplary embodiment, the at least one tank for bulk storage of the bulk liquid is connected to intermodal tanks by a piping system.

In an exemplary embodiment, the bulk liquid is transferred from the at least one bulk storage tank to at least one of the intermodal tanks.

In an exemplary embodiment, the at least one bulk storage tank is located above the main deck of the marine vessel.

In an exemplary embodiment, the at least one bulk storage tank is located below the main deck of the marine vessel.

A method for transporting bulk liquids intermodally in accordance with another exemplary embodiment of the present invention comprises the steps of providing a marine vessel with a piping system, interconnecting intermodal tanks to the piping system, and filling the intermodal tanks with a bulk liquid at a marine terminal as if in a bulk mode.

In an exemplary embodiment, the intermodal tanks are detachably secured to the piping system.

In an exemplary embodiment, the intermodal tanks are interconnected so as to allow rapid connection and disconnection of the intermodal tanks without the use of tools.

In an exemplary embodiment, at least one of the intermodal tanks is detached from the piping system, lifted, and transferred to an intermodal form of transportation.

In an exemplary embodiment, at least one empty intermodal tank is loaded onto the marine vessel and is detachably connected to the piping system.

In an exemplary embodiment, the bulk liquid is discharged from the intermodal tanks to a marine terminal as if in a bulk mode.

BRIEF DESCRIPTION OF THE DRAWINGS

Advantages of the present invention may become apparent to those skilled in the art with the benefit of the following detailed description and upon reference to the accompanying drawings, in which.

DETAILED DESCRIPTION OF PREFERRED EMBODIMENTS

In accordance with exemplary embodiments of the present invention, a specialized marine vessel of either ship or barge form (and a system and method of using the same) has at one and the same time characteristics of both a tanker vessel and a container vessel and is capable of loading and unloading bulk liquids at a marine terminal and at a container port. In an exemplary embodiment, the configuration of the marine vessel facilitates the ability to load and unload a substantial number of ISO-sized intermodal LNG tanks on the vessel in a manner similar to the loading and unloading of standard freight containers on a modern container vessel. The intermodal LNG tanks, are stacked and distributed on the vessel, and are interconnected using a piping system that is an integral part of the vessel.

Definitions of certain terms used in the detailed description are as follows:

Self-propelled vessel—a marine vessel with permanently installed capability to propel itself at sea, i.e., a "ship."

Non-self-propelled vessel—a marine vessel without permanently installed capability to propel itself at sea, i.e. a "barge". A "self-propelled" vessel that is, for whatever reason, not using its installed capability for propulsion is not a "non-self-propelled" vessel.

Main deck—the uppermost weather tight deck of the hull of a marine vessel.

ISO—International Standards Organization.

DOT—United States of America Department of Transportation.

IGC Code—International Code for the Construction and Equipment of Ships Carrying Liquefied Gases in Bulk, promulgated by the International Maritime Organization.

Intermodal—a multi-modal form of transportation that uses marine, over-the-road truck, or rail transportation to move a commodity (in this case, LNG) in intermodal LNG tanks through the supply chain from production to consumer.

Intermodal LNG Tank—a tank that is capable of storing LNG or other liquid cryogenic gas for extended periods and that can be lifted on and off an intermodal transportation form whether in its full or empty condition.

Figure 1:
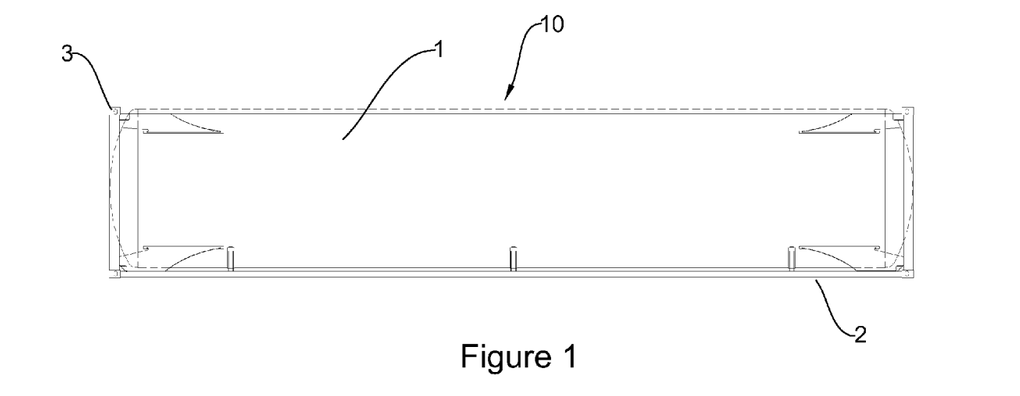
FIG. 1 is a profile view of an intermodal LNG tank.

Referring to FIG. 1, a standard intermodal LNG tank 10 includes a DOT-approved cryogenic liquid tank 1 configured in a support and lifting frame 2 which is compatible with ISO standards for intermodal containers, thereby allowing transport of the cryogenic liquid tank 1 by established intermodal transportation methods. Such intermodal LNG tanks are commercially available from a variety of sources internationally. In accordance with the embodiments of the invention, intermodal LNG tank 10 is certified for the carriage of LNG. A typical intermodal LNG tank is 40 ft. long, 8 ft. wide, and 8 ft., 6 in. high, and is thus identical in size and shape to standard ISO freight containers used in intermodal freight transport. It should be understood, however, that these dimensions are not limiting, as a variety of other sizes are available to be compatible with intermodal freight transportation on a worldwide basis. The corner fittings 3 of frame 2 are compatible with the standard securing and lifting equipment that is typically used in the intermodal freight transportation system.

Figure 2:
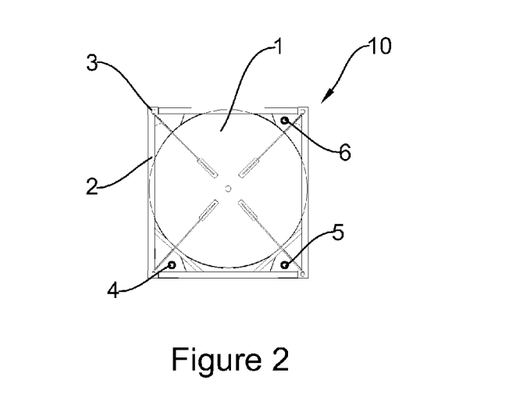
FIG. 2 is an end view of the intermodal LNG tank shown in FIG. 1.

FIG. 2 depicts an end view of the intermodal LNG tank 10 depicted in FIG. 1. Intermodal LNG tank 10 is fitted with a connection 4 and the necessary piping and valves to connect the intermodal LNG tank 10 to an LNG liquid transfer system of an intermodal LNG vessel in accordance with the embodiments of the present invention; a connection 5 and the necessary piping and valves to connect the intermodal LNG tank 10 to an LNG vapor system of an intermodal LNG vessel in accordance with the embodiments of the present invention; and a connection 6 and the necessary piping and tank relief valves to connect the intermodal LNG tank 10 to a vapor relief system of an intermodal LNG vessel in accordance with the embodiments of the present invention.

Figure 3:
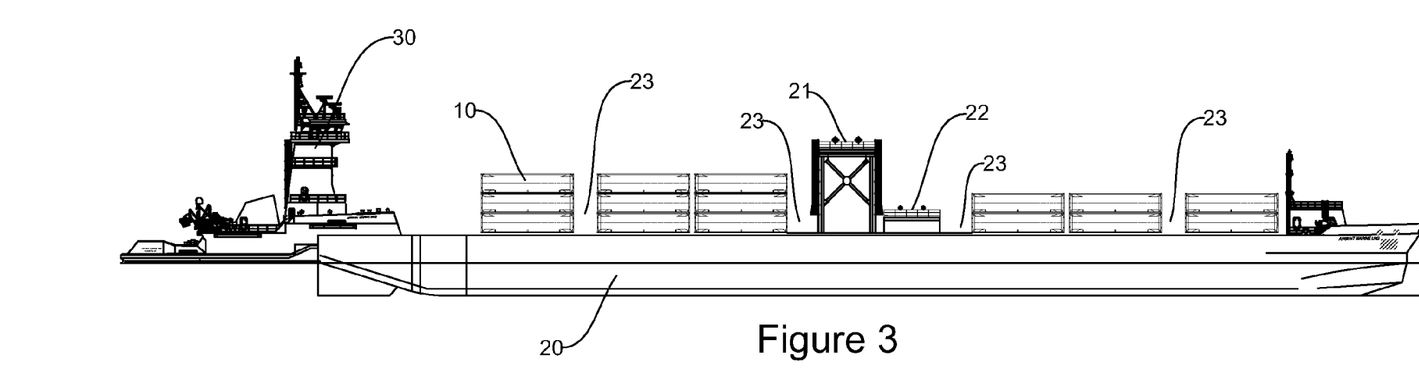
FIG. 3 is a profile view of an intermodal LNG vessel in accordance with an embodiment of the present invention.

FIG. 3 shows a profile view of an intermodal LNG vessel 20 in accordance with an embodiment of the present invention. In a preferred embodiment, intermodal LNG vessel 20 is a non-self-propelled vessel, e.g., a barge, and propulsion of intermodal LNG vessel 20 is provided by a tug 30. In accordance with this embodiment of the present invention, the intermodal LNG vessel 20 and the tug 30 are connected by a semi-rigid connection, which restricts motion in all but one degree of freedom; so that the intermodal LNG vessel 20 and the tug 30 are free to pitch independently. Such a connection is known to those skilled in the art as an Articulated Tug and Barge (AT/B). This particular embodiment should not be considered as limiting in any way. The intermodal LNG vessel 20 could be embodied in other non-self-propelled vessel configurations, or in a self-propelled vessel of any number of varieties, forms and configurations (e.g., a ship), without departing from the scope of the invention as defined in the claims.

The intermodal LNG tanks 10 are stowed and secured on the intermodal LNG vessel 20 in a manner that is consistent with standard practice in the marine freight container trade. In one embodiment, the intermodal LNG tanks 10 are contained within frames or cell guides that allow the intermodal LNG tanks to be rapidly lifted on or off the intermodal LNG vessel 20 by inserting them into the cell guides. The cell guides provide the necessary support and securing method for the intermodal LNG tanks 10. Therefore, no further labor is required during the loading or unloading operation, and the intermodal LNG tanks 10 can be rapidly connected and disconnected to/from the piping system of the intermodal LNG vessel 20 without the use of tools. Another possible method of securing the intermodal LNG tanks 10 is to interlock them together by using securing locks between their corners 3. Those of ordinary skill in the art will understand that other methods of securing the intermodal LNG tanks 10 may also be employed without departing from the scope of the present invention as defined in the appended claims.

In accordance with an embodiment of the present invention, the intermodal LNG vessel 20 includes a piping system that is an integral part of the intermodal LNG vessel 20, and further includes a common LNG vapor relief system, a common LNG vapor system, and a common LNG liquid transfer system that are incorporated in the piping system. Once the intermodal LNG tanks 10 are loaded onto the intermodal LNG vessel 20, they are individually connected to the piping system of the intermodal LNG vessel 20 in a manner that connects all of the intermodal LNG tanks 10 to the common LNG vapor relief system, the common LNG vapor system, and the common LNG liquid transfer system.

Figure 4:
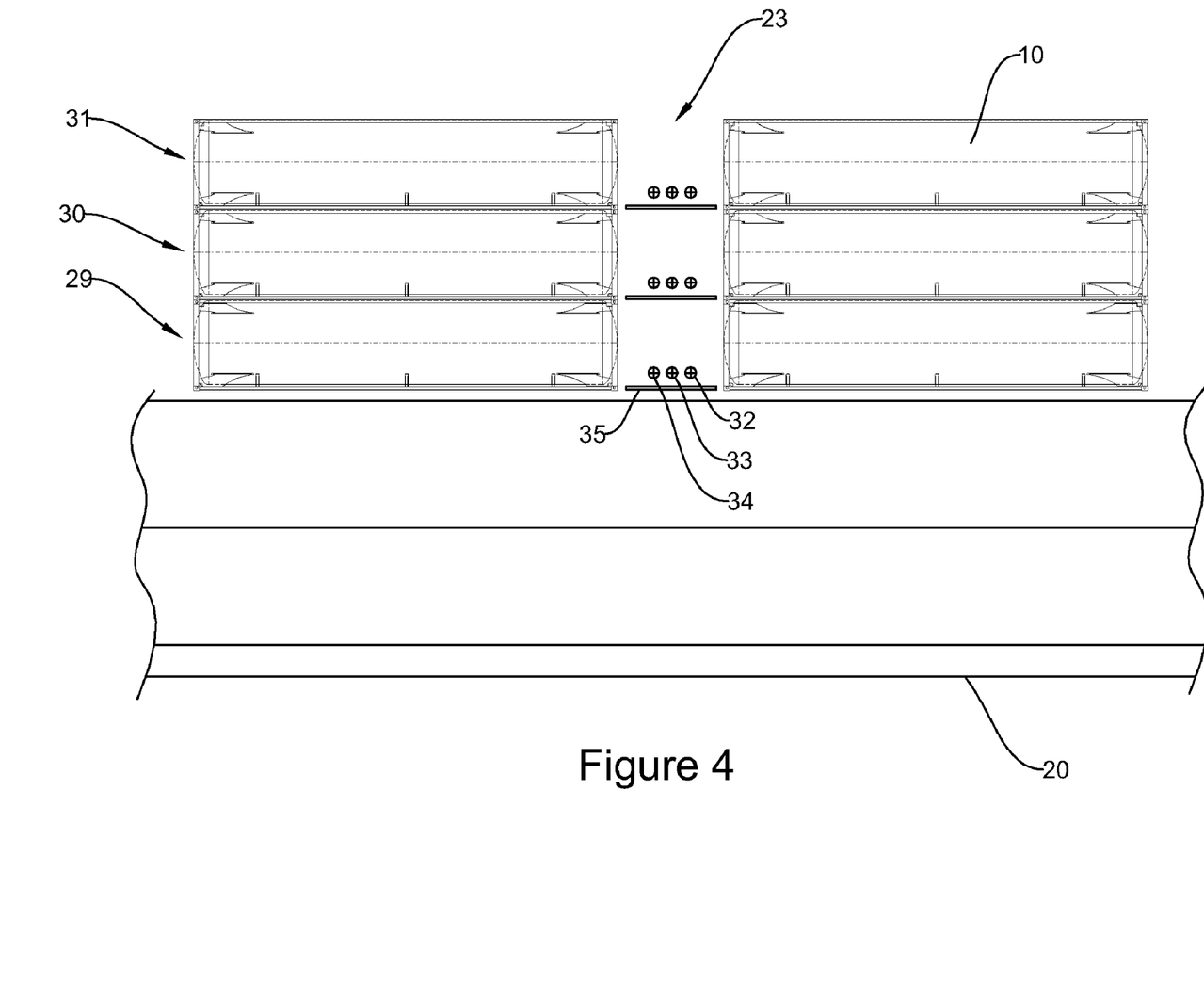
FIG. 4 is a view in detail of an aspect of the intermodal LNG vessel shown in FIG. 3.

FIG. 4 is a view in detail of the area 23 shown in FIG. 3. The stacking levels for the intermodal LNG tanks 10 are shown as a first level 29, a second level 30, and a third level 31. Although three stacking levels are shown, it will be understood by those skilled in the art that any number of stacking levels can be employed. An LNG vapor relief system transverse header 32, an LNG vapor system transverse header 33, and an LNG liquid transfer system transverse header 34 are located in the area 23 between the stacks of intermodal LNG tanks 10. These transverse headers 32, 33, 34 are repeated at each stacking level 29, 30, 31. A transverse access platform 35 is provided at each stacking level 29, 30, 31 to allow convenient access for making the connections from each intermodal LNG tank 10 to the transverse headers 32, 33, 34.

Figure 5:
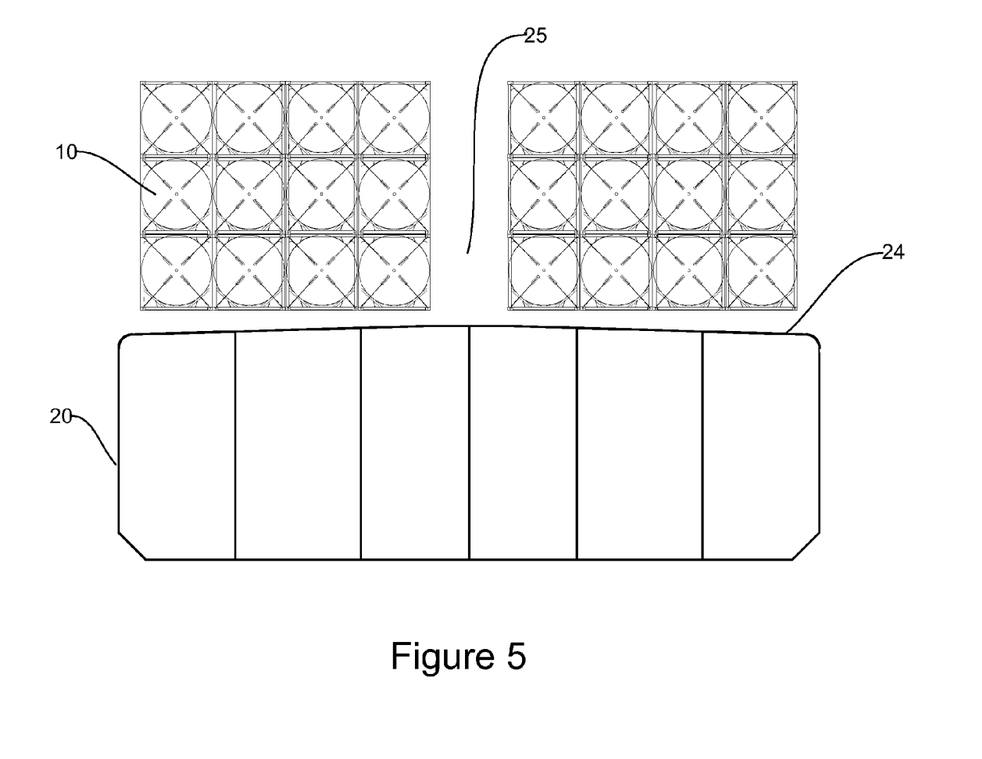
FIG. 5 is a cross section view of the intermodal LNG vessel shown in FIG. 3.

FIG. 5 shows a cross section of the intermodal LNG vessel 20 depicted in FIG. 3. The intermodal LNG tanks 10 are shown stacked above the main deck 24 and arranged in container cell guides. In an exemplary embodiment, an area 25 is provided on or near the centerline of the vessel 20 to provide personnel access and to provide a place for fore and aft system headers, as described below.

Figure 6:
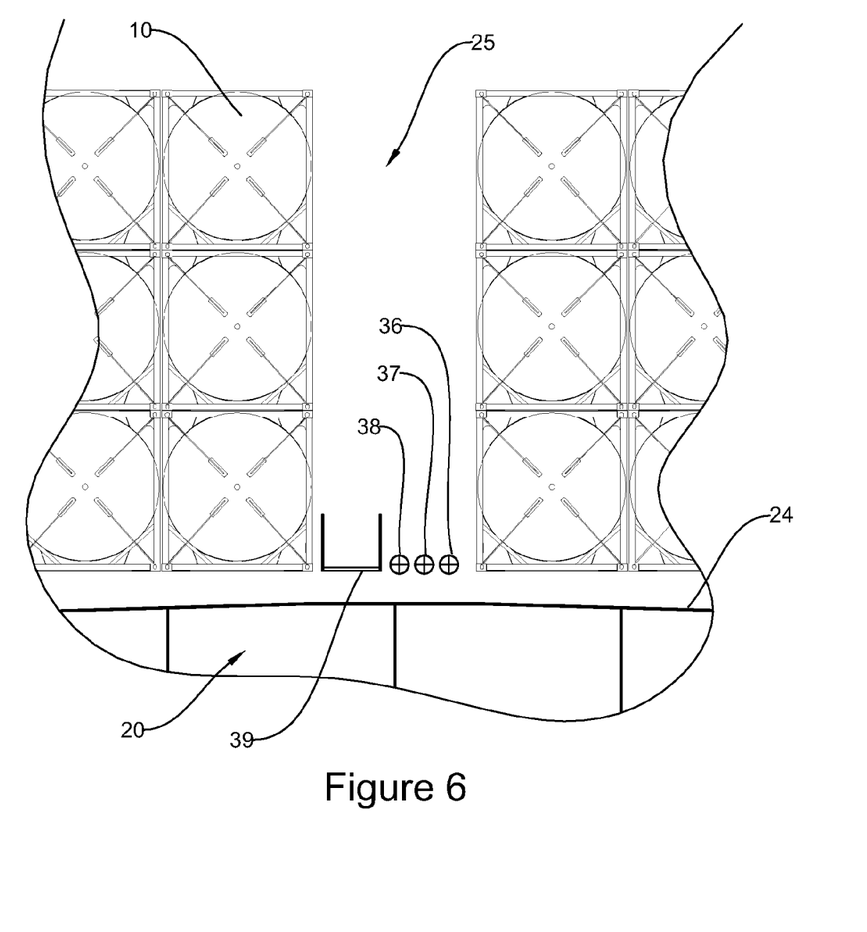
FIG. 6 is a view in detail of an aspect of the cross section view of the intermodal LNG vessel shown in FIG. 5.

FIG. 6 is a view in detail of the area 25 shown in FIG. 5. An LNG vapor relief system fore and aft header 36, an LNG vapor system fore and aft header 37, and an LNG liquid transfer system fore and aft header 38 are located in the area 25. An access walkway 39 is provided for personnel access fore and aft on the intermodal LNG vessel 20.

Referring to FIGS. 4-6, the intermodal LNG tanks 10 are individually connected to the piping system of the intermodal LNG vessel 20 in a manner that connects all of the intermodal LNG tanks 10 to the common LNG vapor relief system on the intermodal LNG vessel 20 via the tank relief connection 6 to safely vent LNG vapor, resulting from an over-pressure condition within any intermodal LNG tank 10, to the vent system of the intermodal LNG vessel 20. In a preferred embodiment, the vent system of the intermodal LNG vessel 20 commonly connects the intermodal LNG tanks 10 to the transverse headers 32 that are arranged vertically at each stacking level 29, 30, 31 of the intermodal LNG tanks 10. These transverse headers 32 are located optimally in the area 23 between stacks of intermodal LNG tanks 10 to provide connection efficiency between the transverse headers 32 and the intermodal LNG tanks 10. These transverse headers 32 are connected to the common fore and aft header 36, which is connected to the vent mast(s) (not shown) on the intermodal LNG vessel 20. This vent system and vent mast(s) are to be installed in accordance with applicable regulatory requirements, such as the IGC code. The transverse headers 32, the common fore and aft header 36, and the vent mast(s) are the principal, but not the only, components of the common LNG vapor relief system.

The intermodal LNG tanks 10 are also individually connected to the piping system of the intermodal LNG vessel 20 in a manner that connects all of the intermodal LNG tanks 10 to a common LNG vapor system on the intermodal LNG vessel 20 via the tank vapor connection 5 in a manner that safely allows the pressure in each intermodal LNG tank 10 to be maintained. The vapor system of the intermodal LNG vessel 20 commonly connects the intermodal LNG tanks 10 to the transverse headers 33 that are arranged vertically at each stacking level 29, 30, 31 of the intermodal LNG tanks 10. These transverse headers 33 are located optimally in the area 23 between the stacks of intermodal LNG tanks to provide connection efficiency between the transverse headers 33 and the intermodal LNG tanks 10. These transverse headers 33 are connected to the common fore and aft header 37, which is connected to the boil-off gas control system of the intermodal LNG vessel 20 and to the loading/unloading manifolds 21 and 22. The LNG vapor system on the intermodal LNG vessel 20 is capable of maintaining the vapor pressure in the intermodal LNG tanks 10 to desired levels between ambient atmospheric pressure up to the relief valve settings of the intermodal LNG tanks 10. The transverse headers 33, the common fore and aft header 37, and the boil-off gas control system are the principal, but not the only, components of the common LNG vapor system.

The object of the vapor system is to control or limit a pressure increase in the intermodal LNG tanks 10 due to the LNG boil-off gas that is naturally generated from thermal heat leaking into the intermodal LNG tanks 10. This LNG boil-off gas can be handled by a variety of methods that are typically used on LNG vessels. For example, the boil-off gas can be consumed in the vessel's engines or in a gas combustor unit, or it can be vented to the atmosphere. In addition, the boil-off gas can be re-liquefied (in whole or in part) and returned to the intermodal LNG tanks 10 by the piping system. A detailed description of one method of re-liquefying the boil-off gas is provided in co-pending U.S. patent application Ser. No. 11/222,750, the contents of which are herein incorporated by reference in their entirety.

The intermodal LNG tanks 10 are also individually connected to the piping system of the intermodal LNG vessel 20 in a manner that connects all of the intermodal LNG tanks 10 to a common LNG liquid transfer system on the intermodal LNG vessel 20 via the tank liquid connection 4 in a manner that allows for the safe transfer of LNG to the intermodal LNG tanks 10 on the intermodal LNG vessel 20 from the manifolds 21 and 22 of the intermodal LNG vessel 20, and vice versa. The LNG liquid transfer system of the intermodal LNG vessel 20 commonly connects the intermodal LNG tanks 10 to the transverse headers 34 that are arranged vertically at each stacking level 29, 30, 31 of intermodal LNG tanks 10. These transverse headers 34 are located optimally in the area 23 between the stacks of intermodal LNG tanks 10 to provide connection efficiency between the transverse headers 34 and the intermodal LNG tanks 10. These transverse headers 34 are connected to a common fore and aft header 38, which is connected to the loading/unloading manifolds 21 and 22. The transverse headers 34, the common fore and aft header 38, and the loading/unloading manifolds 21 and 22 are the principal, but not the only, components of the common LNG liquid transfer system.

In accordance with an embodiment of the invention, an LNG liquid transfer system and control valves are configured to allow the intermodal LNG tanks 10 that have been connected to the piping system of the intermodal LNG vessel 20 to be selectively grouped so that all of the intermodal LNG tanks 10 in a selected subset or subsets of intermodal LNG tanks 10 can be simultaneously filled (to a greater or lesser extent, i.e., fully or partially) or simultaneously discharged (to a greater or lesser extent, i.e., fully or partially). In addition, in accordance with an embodiment of the present invention, all of the intermodal LNG tanks 10 that have been connected to the piping system of the intermodal LNG vessel 20 are capable of being simultaneously filled (to a greater or lesser extent, i.e., fully or partially) or simultaneously discharged (to a greater or lesser extent, i.e., fully or partially) in a time efficient manner similar to bulk tank LNG vessels (e.g., between 6 and 12 hours) by carefully selecting either all of the intermodal LNG tanks 10 or a subset or subsets of the intermodal LNG tanks 10 to be either simultaneously filled (to a greater or lesser extent, i.e., fully or partially) or simultaneously discharged (to a greater or lesser extent, i.e., fully or partially).

Figure 7:
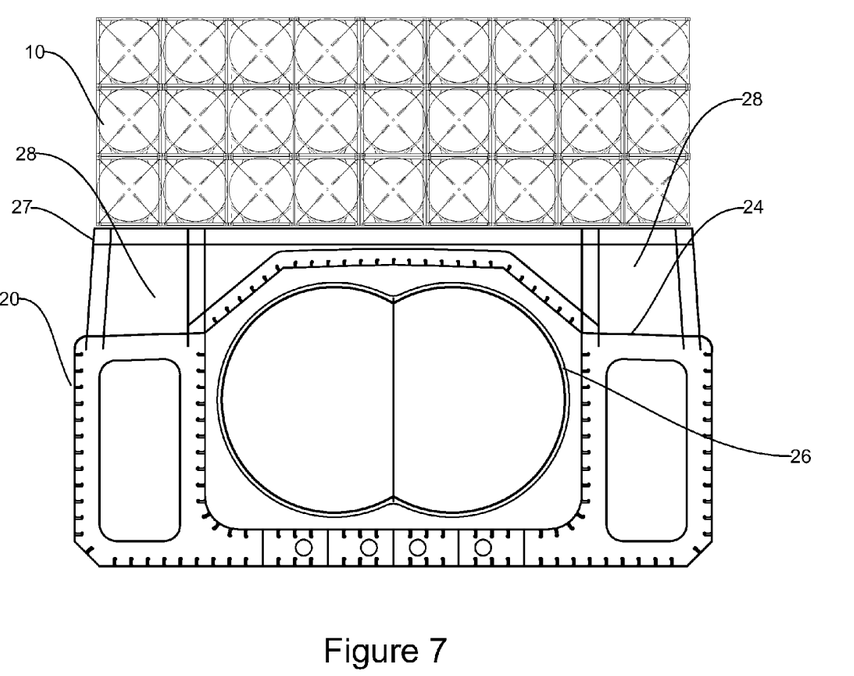
FIG. 7 is a cross section view of a another embodiment of the present invention showing a cross section view of an intermodal LNG vessel that includes the capability to carry LNG in at least one bulk tank as well as in intermodal LNG tanks.

FIG. 7 is a cross section view of another embodiment in accordance with the present invention, in which at least one bulk LNG tank 26 is fitted within the intermodal LNG vessel 20, below the main deck 24 of the vessel 20. Intermodal LNG tanks 10 are stacked in cell guides on a supporting structure 27 secured above the main deck 24 over the area occupied by the bulk LNG tank(s) 26. Those of ordinary skill in the art will appreciate that other configurations and locations for the bulk LNG tank(s) 26 can be employed, including, but not limited to, having all of the intermodal LNG tanks 10 and the bulk LNG tank(s) 26 located above the main deck 24. In an exemplary embodiment, an area 28 for personnel access and fore and aft system headers is created beneath the intermodal LNG tanks 10 port and starboard.

Referring to FIG. 3, the high loading/discharge manifold 21 on the intermodal LNG vessel 20 is capable of interfacing with marine LNG terminals that serve typical ocean going LNG vessels. The high manifold 21 is used for (but is not limited to) loading or discharging (i.e., emptying), as if in a bulk mode, the intermodal LNG tanks 10 with LNG when they are loaded on the intermodal LNG vessel 20 and are connected to its piping system, or, alternately, the bulk LNG tank(s) 26 of the intermodal LNG vessel 20 (shown in FIG. 7). The low loading/discharge manifold 22 is capable of interfacing with smaller marine LNG terminals typical of downstream fuel distribution terminals. The low manifold 22 is used for (but is not limited to) discharging or loading, as if in a bulk mode, LNG to or from the intermodal LNG tanks 10 when they are loaded on the intermodal LNG vessel 20 and are connected to its piping system, or, alternately, to the bulk LNG tank(s) 26 of the intermodal LNG vessel 20 (shown in FIG. 7).

In operation, intermodal LNG vessel 20 contains a number (e.g., 120) of the intermodal LNG tanks 10, which are stacked and distributed on the intermodal LNG vessel 20, and are interconnected using the piping system that is an integral part of the intermodal LNG vessel 20. Intermodal LNG vessel 20 is capable of berthing at the loading/unloading berth at typical LNG marine terminals. The intermodal LNG tanks 10 are capable of being simultaneously loaded or filled to a greater or lesser extent (i.e., fully or partially)—as though constituting a single tank (i.e., in "bulk" mode)—in a time efficient manner at the LNG marine terminal loading/unloading berth. In other words, from the perspective of the LNG marine terminal, the intermodal LNG vessel 20 appears no different than a standard LNG tanker ship or gas carrier.

Once the intermodal LNG vessel 20 departs the LNG terminal, it can proceed to any container port or to any other place where LNG may be discharged, whether on a container-by-container basis or on a bulk discharge basis. In accordance with the embodiments of the present invention, LNG can be offloaded from the intermodal LNG vessel 20 in one of two ways.

First, at a more traditional LNG marine terminal, the intermodal LNG vessel 20 has the capability of bulk discharging the LNG from the intermodal LNG tanks 10 or the bulk tank(s) 26 into the terminal's shore side bulk tanks through typical LNG piping connections (e.g., hose or so called articulated "hard arms") to one of the manifolds 21 and 22 of the intermodal LNG vessel 20. In this mode, the intermodal LNG tanks 10 remain on the intermodal LNG vessel 20, connected to its piping system, for the return voyage to the LNG loading terminal to be reloaded with LNG efficiently and simultaneously as if in a bulk mode.

Second, at a container port or similar marine facility that has a suitable loading/unloading infrastructure and is capable of safely berthing the intermodal LNG vessel 20, in a "lift-off/lift-on" (LO/LO) mode, the interconnected intermodal LNG tanks 10 are individually detached from the piping system of the intermodal LNG vessel 20, are lifted from the vessel via typical freight container cranes, and are transferred into the extensive intermodal transportation system for delivery of the LNG to an end user. The delivery could be made by rail, over-the-road truck, or additional marine vessel. The intermodal LNG tanks 10 could also be marshaled at a storage and fuel distribution facility within the port or other area, or end user facility, where the LNG contained within the intermodal LNG tanks 10 can be used to fuel vehicles, vessels or other end users of the fuel as needed. This manner of offloading the intermodal LNG tanks 10 from the intermodal LNG vessel 20 parallels the intermodal transportation of goods in standard ISO freight containers. In other words, from the perspective of the discharge port, the intermodal LNG vessel appears no different than a standard container ship.

As shown in FIG. 7, the intermodal LNG vessel 20 could also be fitted with one or more bulk LNG tank(s) 26, in addition to the interconnected intermodal LNG tanks 10 that are already on the vessel, thereby increasing the capacity and utility of the intermodal LNG vessel 20. The bulk LNG tank(s) 26 can be coupled to the plurality of intermodal LNG tanks 10, and LNG can be transferred from the bulk tank(s) 26 to at least one of the intermodal LNG tanks 10. Accordingly, if so fitted with bulk tank(s) 26, the intermodal LNG vessel 20 would also have the capability to back load empty intermodal LNG tanks 10 onto the intermodal LNG vessel 20 and to refill the empty intermodal LNG tanks 10 from the bulk LNG tank(s) 26 of the intermodal LNG vessel 20 without having to return to the LNG loading terminal for additional LNG, thereby effectively increasing the number of full intermodal LNG tanks 10 delivered on any particular voyage and loading operation at a marine LNG terminal. Alternatively, LNG can be discharged from the bulk LNG tank(s) 26 alone in a bulk mode, or from the bulk LNG tank(s) 26 in a bulk mode and from the intermodal LNG tank(s) 10 as if in a bulk mode, to an LNG marine terminal.

In view of the foregoing detailed description, one of ordinary skill in the art will understand that an intermodal LNG vessel, system, and method in accordance with the embodiments of the present invention can make multiple deliveries to a number of different ports, both bulk and intermodal terminals, on any given voyage, thereby facilitating efficient distribution of LNG.

As described in the context of the embodiments presented in the foregoing detailed description, the present invention involves using multiple intermodal containerized tanks together as a group for the filling, discharge, and control of bulk liquids on a non-bulk-tanker vessel, so as to enable the non-bulk-tanker vessel to replicate the functional ability of a bulk tanker vessel to load and discharge liquids, including LNG, onto and off the vessel in bulk. The invention further involves the individual offloading of one or more of the intermodal containerized tanks so as to facilitate the use of the same non-bulk-tanker vessel to distribute non-bulk, smaller, parcel-like, intermodal quantities of liquid, including LNG, from the non-bulk-tanker vessel, without altering its capability to distribute bulk quantities of the liquid.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification. Without limiting the generality of the foregoing, those skilled in the art will appreciate that the embodiments in accordance with the present invention are not limited to LNG or other cryogenic liquid gases, but, instead, include and encompass the transportation and distribution of any bulk liquid (e.g., light distillate fuels, gasoline, ethanol, etc.) that is capable of being contained in ISO sized intermodal tanks.

What is claimed is:

1. A marine vessel, comprising:
a main deck;
one or more container cell guides disposed above the main deck;
one or more ISO intermodal LNG tanks disposed in the container cell guides to form one or more stacking levels of intermodal LNG tanks;
a liquid transfer system comprising a liquid transfer system header for each stacking level of the intermodal LNG tanks, wherein each one of the intermodal LNG tanks in a stacking level of intermodal LNG tanks is individually coupled to the liquid transfer system header for that stacking level of intermodal LNG tanks to transfer LNG to and from the intermodal LNG tanks;
a vapor system comprising a vapor system header for each stacking level of the intermodal LNG tanks, wherein each one of the intermodal LNG tanks in a stacking level of intermodal LNG tanks is individually coupled to the vapor system header for that stacking level of intermodal LNG tanks to transfer boil-off as from the intermodal LNG tanks; and a boil-off gas control system coupled to the vapor system header to maintain vapor pressure in each one of the intermodal LNG tanks at a desired level.

2. The marine vessel of claim 1, wherein LNG can be transferred to and from the one or more ISO intermodal LNG tanks as if in a bulk mode.

3. The marine vessel of claim 1, further comprising a vent system comprising a vent system header for each stacking level of the intermodal LNG tanks, wherein each one of the intermodal LNG tanks is individually coupled to the vent system header for that stacking level of intermodal LNG tanks to vent LNG vapor from any of the one or more intermodal LNG tanks.

4. The marine vessel of claim 1, wherein boil-off gas from the one or more intermodal LNG tanks is provided to the boil-off gas control system.

5. The marine vessel of claim 4, further comprising engines that consume boil-off gas.

6. The marine vessel of claim 4, further comprising a gas combustor unit that consumes the boil-off gas.

7. The marine vessel of claim 4, wherein the boil-off gas is vented to the atmosphere.

8. The marine vessel of claim 1, wherein the boil-off gas control system reliquefies the boil-off gas.

9. The marine vessel of claim 8, wherein the reliquefied boil-off gas is returned to the one or more intermodal LNG tanks by the liquid transfer system header.

10. The marine vessel of claim 1, further comprising at least one manifold coupled to the liquid transfer system header for loading LNG onto the marine vessel.

11. The marine vessel of claim 1, further comprising at least one manifold coupled to the liquid transfer system header for unloading LNG from the marine vessel.

12. The marine vessel of claim 1, further comprising at least one tank for bulk storage of LNG.

13. The marine vessel of claim 12, wherein the at least one tank for bulk storage of LNG is connected to the one or more intermodal LNG tanks by the liquid transfer system header.

14. The marine vessel of claim 13, wherein LNG is transferred from the at least one tank for bulk storage to at least one of the intermodal LNG tanks.

15. The marine vessel of claim 12, wherein the at least one tank for bulk storage is located above the main deck of the marine vessel.

16. The marine vessel of claim 12, wherein the at least one tank for bulk storage is located below the main deck of the marine vessel.

17. The marine vessel of claim 1, further comprising a supporting structure secured above the main deck.

18. The marine vessel of claim 17, wherein the container cell guides are disposed on the supporting structure.

19. The marine vessel of claim 1, wherein the liquid transfer system comprises a plurality of control valves configured to selectively group the intermodal LNG tanks.

20. A method for transporting LNG intermodally, the method comprising:
providing a plurality of intermodal LNG tanks on a main deck of a marine vessel;
interconnecting the plurality of intermodal LNG tanks to a piping system;
berthing the marine vessel at a first marine terminal that is equipped to load and unload a bulk quantity of LNG;
filling the LNG tanks with LNG as if in a bulk mode at the first marine terminal;
managing a pressure increase in the plurality of intermodal LNG tanks due to boil-off gas generated within the intermodal LNG tanks; and
berthing the marine vessel at a second marine terminal, wherein the second marine terminal is equipped to either lift one or more individual intermodal LNG tanks off the marine vessel and transfer them to a component of an intermodal transportation system or unload the LNG contained in the intermodal LNG tanks in bulk.

21. The method of claim 20, wherein the interconnecting step comprises the step of detachably securing the plurality of intermodal LNG tanks to the piping system.

22. The method of claim 20, wherein the interconnecting step comprises the step of interconnecting the plurality of intermodal LNG tanks so as to allow rapid connection and disconnection of the plurality of intermodal LNG tanks without the use of tools.

23. The method of claim 20, further comprising the steps of:
detaching at least one of the plurality of intermodal LNG tanks from the piping system;
lifting the at least one intermodal LNG tank; and
transferring the at least one intermodal LNG tank to the component of the intermodal transportation system.

24. The method of claim 23, wherein the component of the intermodal transportation system comprises a marine vessel.

25. The method of claim 23, wherein the component of the intermodal transportation system comprises a truck.

26. The method of claim 23, wherein the component of the intermodal transportation system comprises a rail car.

27. The method of claim 20, further comprising the steps of:
loading at least one empty intermodal LNG tank onto the marine vessel; and
detachably connecting the at least one empty intermodal LNG tank to the piping system.

28. The method of claim 20, further comprising the step of discharging LNG from the plurality of intermodal LNG tanks as if in a bulk mode.

29. The method of claim 20, wherein the second marine terminal is equipped with a crane to lift one or more individual intermodal LNG tanks off the marine vessel and transfer them to a component of an intermodal transportation system.

30. The method of claim 20, wherein the second marine terminal is equipped with a hose to unload the LNG contained in the intermodal LNG tanks in bulk.

31. The method of claim 20, wherein the second marine terminal is equipped with hard arms to unload the LNG contained in the intermodal LNG tanks in bulk.

32. The method of claim 31, wherein the hard arms comprise articulated hard arms.

33. A method for transporting bulk liquids intermodally, the method comprising:
providing a plurality of ISO intermodal tanks on a main deck of a marine vessel;
interconnecting the plurality of intermodal tanks to a piping system;
berthing the marine vessel at a first marine terminal that is equipped to load and unload a bulk quantity of LNG;
filling the plurality of ISO intermodal tanks with LNG as if in a bulk mode at the first marine terminal; and
berthing the marine vessel at a second marine terminal, wherein the second marine terminal equipped to either lift one or more individual ISO intermodal tanks from the marine vessel and transfer them to a component of an intermodal transportation system or unload the LNG contained in the ISO intermodal tanks in bulk.

34. The method of claim 33, wherein the interconnecting step comprises the step of detachably securing the plurality of intermodal tanks to the piping system.

35. The method of claim 33, wherein the interconnecting step comprises the step of interconnecting the plurality of intermodal tanks so as to allow rapid connection and disconnection of the intermodal tanks without the use of tools.

36. The method of claim 33, further comprising the steps of:
detaching at least one of the plurality of intermodal tanks from the piping system;
lifting the at least one intermodal tank; and
transferring the at least one intermodal tank to the component of the intermodal transportation system.

37. The method of claim 36, wherein the component of the intermodal transportation system comprises a marine vessel.

38. The method of claim 36, wherein the component of the intermodal transportation system comprises a truck.

39. The method of claim 36, wherein the component of the intermodal transportation system comprises a rail car.

40. The method of claim 33, further comprising the steps of:
loading at least one empty intermodal tank onto the marine vessel; and
detachably connecting the at least one empty intermodal tank to the piping system.

41. The method of claim 33, further comprising the step of discharging the bulk liquid from the intermodal tanks to a marine terminal as if in a bulk mode.

42. The method of claim 33, wherein the second marine terminal is equipped with a crane to lift one or more individual intermodal tanks off the marine vessel and transfer them to a component of an intermodal transportation system.

43. The method of claim 33, wherein the second marine terminal is equipped with a hose to unload the liquid contained in the intermodal tanks in bulk.

44. The method of claim 33, wherein the second marine terminal is equipped with hard arms to unload the liquid contained in the intermodal tanks in bulk.

45. The method of claim 44, wherein the hard arms comprise articulated hard arms.

46. A marine vessel, comprising:
a main deck,
one or more container cell guides secured to the main deck;
one or more ISO intermodal tanks disposed in the container cell guides to form one or more stacking levels of intermodal tanks; and
a liquid transfer system comprising a liquid transfer system header for each stacking level of intermodal tanks, wherein each one of the intermodal tanks in a stacking level of intermodal tanks is individually coupled to the liquid transfer system header for that stacking level of intermodal tanks;
wherein the plurality of intermodal tanks can be filled with a bulk quantity of a liquid at a first facility and can be lifted off the marine vessel individually at a second facility.

47. The marine vessel of claim 46, wherein the plurality of intermodal tanks can be discharged as if in a bulk mode.

48. The marine vessel of claim 46, further comprising at least one tank for bulk storage of the bulk liquid.

49. The marine vessel of claim 48, wherein the one or more tanks for bulk storage of the bulk liquid are connected to the plurality of intermodal tanks by the liquid transfer system headers for each stacking level of intermodal tanks.

50. The marine vessel of claim 49, wherein the bulk liquid is transferred from the at least one tank for bulk storage to at least one of the plurality of intermodal tanks.

51. The marine vessel of claim 48, wherein the at least one tank for bulk storage is located above the main deck of the marine vessel.

52. The marine vessel of claim 48, wherein the at least one tank for bulk storage is located below the main deck of the marine vessel.

53. The marine vessel of claim 46, further comprising a supporting structure secured above the main deck.

54. The marine vessel of claim 53, wherein the container cell guides are disposed on the supporting structure.

55. The marine vessel of claim 46, wherein the liquid transfer system comprises a plurality of control valves configured to selectively group the intermodal tanks.

* * * * *